United States Patent [19]
Clements

[11] 4,432,429
[45] Feb. 21, 1984

[54] AIR-CUSHION APPARATUS

[75] Inventor: Harold J. Clements, Canterbury, England

[73] Assignee: Modern Precision Engineers and Associates Limited, Ashford, England

[21] Appl. No.: 287,558

[22] Filed: Jul. 28, 1981

[30] Foreign Application Priority Data

Jul. 30, 1980 [GB] United Kingdom ............... 8024948
Nov. 28, 1980 [GB] United Kingdom ............... 8038187

[51] Int. Cl.³ .............................................. B60V 1/02
[52] U.S. Cl. ................................. 180/127; 180/119
[58] Field of Search ............... 180/127, 128, 116, 119

[56] References Cited

U.S. PATENT DOCUMENTS

| | | | |
|---|---|---|---|
| 3,185,238 | 5/1965 | Coates | 180/125 |
| 3,243,004 | 3/1966 | Mackie | 180/128 |
| 3,258,080 | 6/1966 | Williams et al. | 180/124 |
| 3,400,780 | 9/1968 | Kesling | 180/124 |
| 3,513,934 | 5/1970 | Crowley | 180/127 |
| 3,513,935 | 5/1970 | Noble | 180/128 |
| 3,613,822 | 10/1971 | Mackie | 180/128 |
| 4,172,506 | 10/1979 | Terry | 180/127 |
| 4,275,869 | 6/1981 | Clements | 254/89 H |

FOREIGN PATENT DOCUMENTS

| | | |
|---|---|---|
| 1900361 | 7/1972 | Fed. Rep. of Germany . |
| 2557860 | 6/1976 | Fed. Rep. of Germany . |
| 1235605 | 6/1971 | United Kingdom . |
| 1258243 | 12/1971 | United Kingdom . |
| 1307342 | 2/1972 | United Kingdom . |
| 1308441 | 2/1973 | United Kingdom . |
| 1333496 | 10/1973 | United Kingdom . |
| 1491100 | 11/1977 | United Kingdom . |
| 2027655 | 2/1980 | United Kingdom . |

*Primary Examiner*—David M. Mitchell
*Assistant Examiner*—Donn McGiehan
*Attorney, Agent, or Firm*—Birch, Stewart, Kolasch & Birch

[57] ABSTRACT

An air-cushion supported, manually manoeuverable, load-carrying apparatus including a load-carrying base, a dependent perimetric skirt for laterally confining pressurized air, and a member for restraining a foot portion of the skirt to a permanently inwardly extending configuration so as to be urged into sealing engagement with the ground by the internal air pressure during operation. The skirt restraining member is secured to the skirt at spaced inner and outer regions, spanning the foot portion. The rectilinear spacing is substantially less than the corresponding width of the foot portion so as to provide the foot portion with freedom to seal with the ground.

16 Claims, 6 Drawing Figures

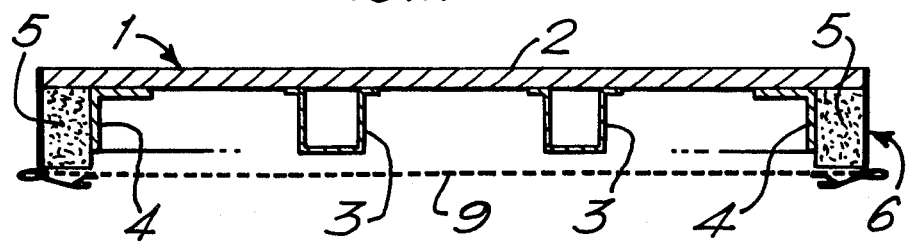
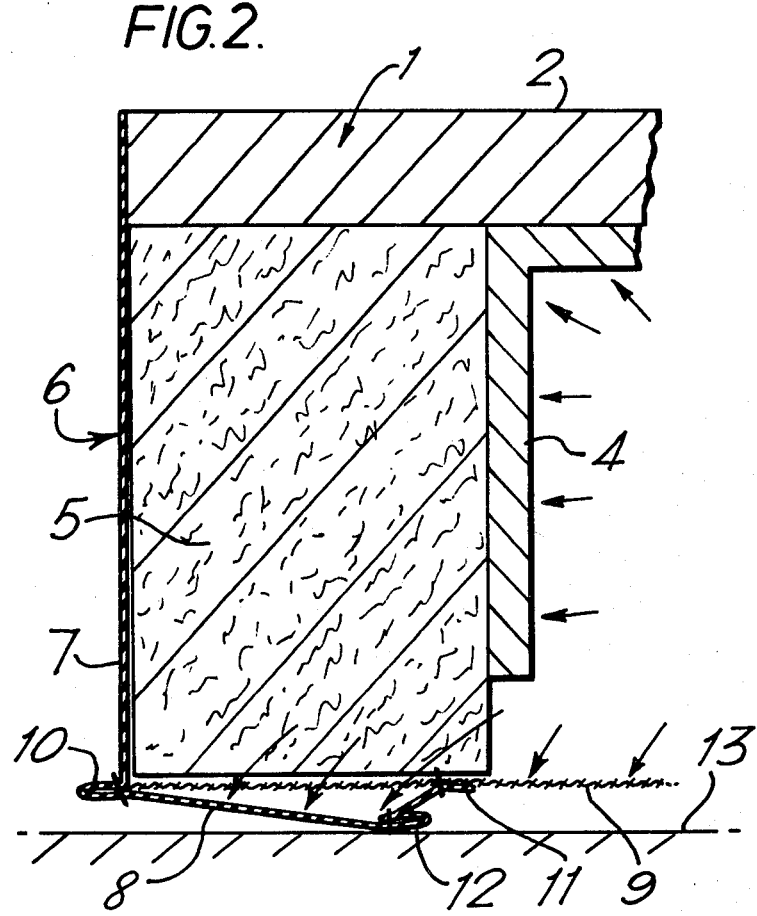

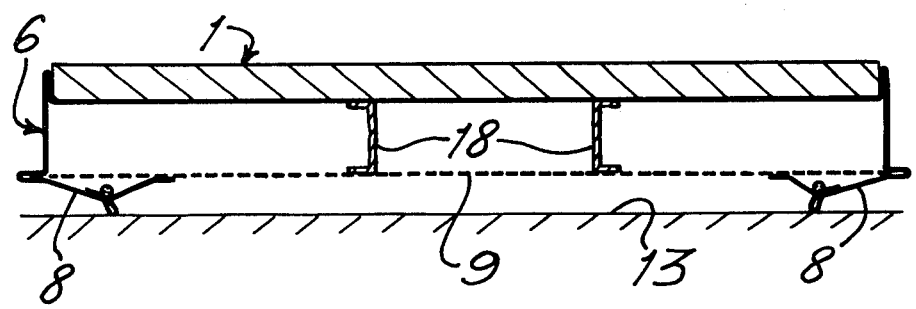
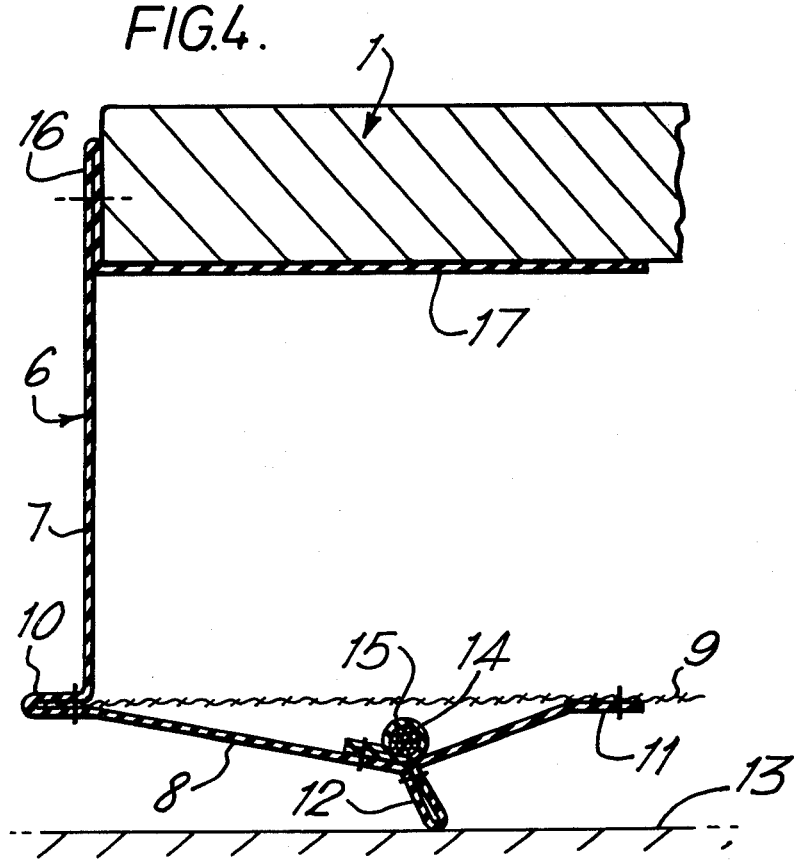

AIR-CUSHION APPARATUS

BACKGROUND OF THE INVENTION

This invention relates to air-cushion apparatus, that is apparatus movable over the ground and which during such movement has its weight at least partially supported by a cushion of air. A primary object of the invention is to provide an improved apparatus of this kind in the form of a load-carrying platform, pallet, trolley or the like for use in the movement of heavy or cumbersome loads, particularly but not exclusively over relatively short distances and, preferably, under the control of only one or two persons.

Thus viewed from one aspect the invention provides an air-cushion supported, manually manoeuverable, load-carrying apparatus comprising a load-carrying base, a dependent perimetric skirt for laterally confining pressurized air, and means for restraining a foot portion of said skirt to a permanently inwardly extending configuration so as to be urged into sealing engagement with the ground by the internal air pressure during operation, wherein the said skirt restraining means is secured to the skirt at spaced inner and outer regions, spanning said foot portion, whose rectilinear spacing is substantially less than the corresponding width of the foot portion so as to provide the foot portion with freedom to seal with the ground as aforesaid.

The apparatus may include rolling or sliding underneath supports secured to the said base member for engagement with the ground at least when the skirt is unpressurized. Such supports may comprise wheels, castors, rollers or skids for example. Such supports facilitate movement of the unloaded apparatus when the skirt is unpressurized and will usually be lifted off the ground when the skirt is unpressurized, but on the other hand they may if desired be arranged to maintain ground contact in such circumstances so as to enable the apparatus to be readily manoeuvered over the ground carrying a load but with only part of its weight supported by the air cushion, i.e. with the load on the wheels or other supports reduced to such as extent as to make the apparatus readily movable by one or two persons. Such a facility is particularly advantageous in circumstances where a heavy load has to be located in a precisely defined position for a subsequent operation, for example when such a load is to be located beneath a particular point on an aircraft and then lifted into a storage compartment thereof. In the latter connection apparatus according to the invention may advantageously be used in conjunction with an inflatable lifting device for the load, and thus the said load-carrying base may carry load-elevating means comprising at least one inflatable cushion having a plurality of laterally-spaced internal compartments arranged to be inflated substantially in concert.

It is of course an essential feature of the above described apparatus that the roof of the pressurised air space should be substantially air-tight. In one form of the invention this is achieved by making the said load-carrying base substantially air-tight, e.g. in the form of a solid board, and providing a substantially air-tight connection between the said base and the skirt. In another form of the invention where the said base is not itself air-tight, being for example in the form of an open framework, the air-tight roof of the pressurized air space is provided as a part separate from the said base but, preferably, connectible thereto and itself integral with or air-tightly connected to the skirt. Thus the said roof and the skirt could be provided as a single unit for operative association with the load-carrying base. The roof part of such a unit could be substantially rigid, e.g. an impermeable board, or it could be made of the said air-tight flexible material as the skirt so as to provide a foldable roof and skirt unit for convenient storage. In one form of the invention such a roof made of air-tight flexible material is provided with a series of parallel substantially rigid stiffening strips or rods incorporated in its structure to provide a unit which can be rolled up for storage but when located under a load-carrying base having structural members extending transversely to the said stiffeners cooperates with the same to provide a stable combined assembly.

The scope of the invention extends to such a roof and skirt unit in itself and thus viewed from another aspect the invention provides an apparatus for forming an air-cushion chamber for location under a load, such apparatus comprising a member forming a substantially air-tight roof for the chamber, a dependent perimetric skirt for laterally confining pressurized air, and means for restraining a foot portion of said skirt to a permanently inwardly extending configuration so as to be urged into sealing engagement with the ground by the internal air pressure during operation, wherein the said skirt restraining means is secured to the skirt at spaced inner and outer regions, spanning said foot portion, whose rectilinear spacing is substantially less than the corresponding width of the foot portion so as to provide the foot portion with freedom to seal with the ground as aforesaid. Such an apparatus, of appropriate size, may be used as an underneath support for the movement of all manner of articles of the most varied types, dimensions and weights.

Preferably the said foot portion of the skirt is provided with at least one ground-engaging sealing fin extending all around the skirt, to minimise frictional contact of the skirt with the ground. A plurality of such sealing fins may be provided spaced laterally of one another, both to enhance the sealing effect and as a means of de-tuning resonant vibrations of the pressurized skirt where it overlies a hollow in an irregular ground surface.

One particularly advantageous application of the invention is in the movement of heavy or cumbersome articles on a floor having an especially smooth surface which might be damaged by a wheeled device carrying a heavy load, such as the floor of a television studio for example. However, when used on less regular ground surfaces it is necessary to meet the problem of air leakage under the skirt, via surface irregularities, during initial pressurization of the pressurized air chamber when air pressure has not yet urged the skirt into substantially continuous sealing engagement with the ground. Thus the apparatus preferably includes means associated with the said skirt adapted to urge the said foot portion thereof into substantially continuous sealing engagement with an irregular ground surface when the skirt is not pressurized.

In one form of the invention such urging means comprises a resilient, vertically compressible, perimetric wall inside the skirt and overlying the said foot portion thereof. Such a wall could comprise a strip of expanded foam material or an inflatable tube. Means may be provided for supporting the said wall against inward displacement during lateral movement of the apparatus over the ground, for example in the form of one or more rigid or semi-rigid members associated with the load-carrying base and extending around the inside of the wall, close to but not necessarily, in contact with the latter. Alternatively, the wall itself may be made sufficiently strong to prevent substantial inward displacement thereof whilst still retaining its necessary resiliency.

An alternative way of overcoming the same problem is to weight the foot portion of the skirt, whilst maintaining its longitudinal flexibility, so that the skirt is urged by gravity into substantially continuous sealing engagement with an irregular ground surface when uninflated. This may be done by attaching a multiplicity of discrete weights to the skirt all around its foot portion inside the same. Preferably the said weights comprise a continuous series of metal balls housed in a flexible tube.

The skirt weighting concept just mentioned is particularly advantageous when applied to the form of our invention described above which provides a unit for forming the air-tight roof and skirt of a pressurized air chamber, for location under any kind of article (not necessarily a platform or pallet as above mentioned) which is to be supported and manoeuvred. The advantage of flexibly weighting the foot portion of the skirt in this form of the invention, rather than employing the resilient perimetric wall previously described, is that the unit is thereby rendered wholly flexible in at least one directin and thus more readily capable of being folded or rolled up for transportation and storage.

On the other hand, as the absence of the said resilient wall means that, unless otherwise supported, the weight of a load-carrying base or other article will rest directly on the foot portion of the skirt when uninflated, which could in some circumstances be harmful to the skirt, this form of the invention is particularly but by no means exclusively suited to embodiments mentioned above in which the load-carrying platform of the apparatus is provided with wheels, castors, rollers, skids or other ground-engaging supports.

It should be particularly noted that the provision of the said urging means as just described makes an apparatus according to the invention especially suitable for relatively small-scale but heavy duty work, for example in enabling only one or two persons to manoeuvre a load of about two tons carried on a pallet or platform of about 2 m×1 m dimensions, as the initial sealing effect thereby provided when operating on an irregular ground surface means that the volumetric air flow needed to initially pressurize the air chamber is relatively small and can be provided by a small pump carried on the apparatus, specifically of only about ¾ h.p. in the case of the particular load and platform dimensions just mentioned. Once pressurized of course, the inwardly restrained arrangement of the skirt for sealing engagement with the ground makes an equally important contribution to the minimization of the energy requirements of the apparatus.

The aforementioned inward restraining means for the skirt may take any of a variety of forms. In one form of the invention it comprises a sheet of air-permeable material such as inextensible net or buckram fabric secured to the skirt all round and thus substantially completely closing the bottom of the air chamber in air-permeable fashion. However, it is by no means essential for such means to extend right across the underside of the apparatus. Thus in an alternative arrangement the foot portion of the skirt could simply be laced to suitable parts of the underside of the load-carrying base all around the apparatus. In another alternative opposite foot portions of the skirt could be tied together by straps extending across the apparatus beneath the base. Two important considerations in the design of the restraining means are firstly that it should hold the skirt in a permanently inwardly extending configuration all around so as to achieve a substantially continuous sealing engagement with the ground under the influence of the internal air pressure, and secondly that it should not incorporate any large areas of air-impermeable material in contact with the ground which would undesirably increase friction during lateral movement of the apparatus. Thus, from the latter point of view, if the restraining means is formed wholly or partly of sheet material this should be air-permeable, or rendered air-permeable for example by piercing, whilst any impermeable strapping or the like should be of minimum width. In a preferred form of the invention such frictional contact is minimized by providing means for holding the said skirt restraining means substantially out of contact with the ground when the skirt is pressurized. Thus flexible tie means may be provided between the inward restraining means for the skirt and the underside of the load-carrying base (or the roof of a flexible roof and skirt unit), which tie means are somewhat shorter than the vertical height of the skirt when inflated and thus act to at least partially hold the said restraining means off the ground with a consequent advantageous reduction in ground friction during manoeuvring.

Whatever the nature or arrangement of the restraining means, the skirt is preferably permanently formed to have a substantially L-shaped transverse cross-section with an upright side wall portion secured to the said base and an inwardly extending ground engaging foot portion substantially at right angles to said wall portion.

More than one air-cushion apparatus in accordance with the invention may be provided as underneath support for a load and, if desired, individually controlled in terms of pressurization so as to take account of imbalance in the load itself.

BRIEF DESCRIPTION OF THE DRAWINGS

Some embodiments of the invention will now be described by way of example and with reference to the accompanying drawings, in which:

FIG. 1 is a cross-sectional view of a first embodiment of a load-carrying apparatus according to the invention, in the form of a pallet, showing the apparatus unpressurized;

FIG. 2 is an enlarged cross-sectional view of the apparatus of FIG. 1, in a partially pressurized condition;

FIGS. 3 and 4 are similar cross-sectional views of a second embodiment, but showing the apparatus fully pressurized;

DETAILED DESCRIPTION OF THE INVENTION

Figure 5:
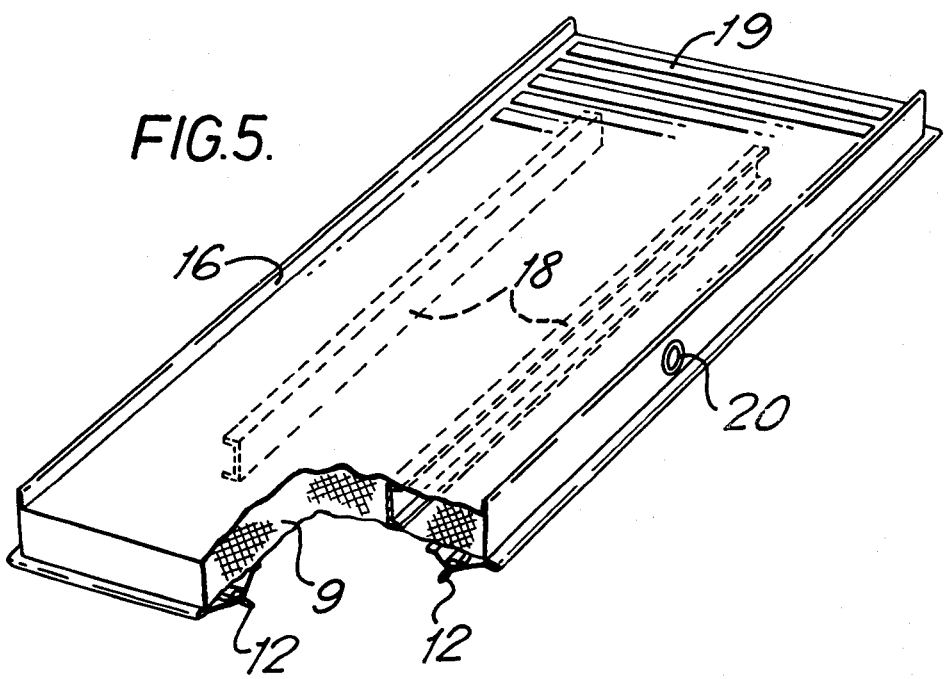
FIG. 5 is a perspective view of the apparatus of FIGS. 3 and 4.

As shown in FIG. 1, an air-cushion apparatus according to the invention comprises a substantially rigid air-impermeable load-carrying base 1 having a load supporting surface 2. In this embodiment, the base 1 comprises a plywood or blockboard panel of about 2 m×1 m dimensions reinforced by two rigid steel sections 3 secured to the underside thereof. The vertical walls of the sections 3 have holes therethrough for air flow.

Rigid, right-angled steel sections 4 are secured to the underside of the base 1 and extend around the entire periphery thereof at a uniform distance from its edges. A resilient wall 5 formed of low-density open-cell foam material and of rectangular cross-section is secured to the underside of the base 1, for example by means of adhesive, and again extends around the entire periphery of the base. The wall 5 may be made of expanded rubber, polyester or other polymeric foam material and is not secured to the members 4, so as to allow vertical compression of the wall.

A flexible, air-impermeable skirt 6 is secured continuously around the edges of the base 1, and surrounds the entire periphery thereof. The skirt 6 is permanently formed to have a substantially right-angled, L-shaped cross-section, comprising a substantially vertical wall portion 7 and a foot portion 8 which underlies the foam wall 5.

The foot portion 8 of the skirt is secured to skirt restraining means in the form of a flexible, air-permeable, substantially inextensible sheet member 9, comprising for example a sheet of net, an apertured sheet or a permeable fabric such as buckram. The sheet member 9 prevents substantial outward movement of the skirt 7.

A control valve (not shown) is mounted on the base 1 and compressed air is supplied to the valve from a suitable source, preferably a pump mounted on the base, to feed compressed air therethrough to the air chamber defined by the base 1 and the skirt 6.

Referring now particularly to FIG. 2, the permeable sheet member 9 is secured to the foot portion 8 of the skirt, for example by stitching, at spaced inner and outer regions, that is outwardly at a seam 10 where the substantially horizontal foot 8 joins the vertical wall portion 7 of the skirt, and inwardly at a seam 11 at the inside edge of the skirt. A sealing fin 12 is formed in the foot portion 8 by stitching. The foot portion 8 is loose between the seams 10 and 11 because the rectilinear spacing between the seams is substantially less than the corresponding width of the foot portion, and the fin 12 is thus free to deflect downwardly (see FIGS. 3 and 4) and seal against the ground surface 13 without substantial restraint by the sheet member 9 even when the latter is taut. At the same time, outward deflection of the skirt is prevented by virtue of the seam 10 securing the sheet 9 to the skirt 6. It will of course be appreciated that the resilient wall 6 is such as to permit the passage of pressurized air therethrough to act directly on the skirt wall and foot, both during initial pressurisation and when fully pressurized.

FIG. 1 shows the apparatus at rest on the ground surface. The weight of the apparatus and any load supported thereon bears upon the expanded foam wall 5 which traps the foot portion 8 of the skirt 6 between itself and the ground. At a certain level of loading the wall 5 is compressed to an extent such that the apparatus rests on the steel sections 3, 4 so that the apparatus then acts as a rigid load-supporting pallet. In addition, the resilient wall 5 and the trapped foot 8 of the skirt will conform to irregularities in the ground surface, thus substantially closing any gaps therebetween and creating a substantially completely enclosed air chamber bounded by the base 1, the skirt 6 and the ground. When compressed air is supplied to this chamber a positive air pressure is produced, thus elevating the pallet. The air supply is at a pressure of for example 2 psig and at a volumetric flow rate of for example 20 to 30 cfm in the typical case of a 2 m × 1 m pallet carrying a load of two tons.

The apparatus will attain equilibrium when the pressure of air is equal to, or just exceeds, the mass of the apparatus and load divided by the area of the pallet. At this point the apparatus (and load) is readily movable in any direction on the ground. As the flow of air into the air chamber is continued, a further elevation of the apparatus occurs, and air starts to leak through the permeable sheet 9 and escape outwardly under the foot 8 of the skirt. Thus, in the presence of a continuous supply of air at above atmospheric pressure, equilibrium will be established maintaining the apparatus in a state of flotation, the efficiency of the apparatus being dependent on the efficiency of the seal between the skirt and the ground.

Referring now to the embodiment of FIGS. 3 to 5, this comprises a wholly flexible air-cushion apparatus, that is one which can be rolled up for transportation and storage as previously mentioned, shown secured to a load-carrying base member 1. Parts of the apparatus which correspond to parts of that shown in FIGS. 1 and 2 are given the same reference numerals and will not be described again.

In this embodiment the resilient wall 5 and associated supporting sections 4 of FIGS. 1 and 2 are omitted, and the function of urging the unpressurized skirt into substantially continuous sealing engagement with an irregular ground surface is taken over by a multiplicity of discrete weights in the form of a continuous series of lead shot balls 14 sewn into a seamed fabric tube 15 attached to the inside of the skirt immediately above the ground-engaging fin 12 of the skirt foot portion 8.

A flange 16 is provided by stitching all around the junction between the side wall 7 of the skirt and its integral roof 17, for attachment of the unit to the structure 1. Two flexible ties in the form of fabric webs 18, somewhat shorter in height than the side walls 7 of the skirt, are secured between the roof 17 and the skirt restraining sheet 9, to hold the sheet 9 off the ground when the unit is pressurized, as illustrated in the Figures. FIG. 5 diagrammatically illustrates, with the structure 1 omitted, the manner in which the roof 17 of the unit may be provided with transverse stiffeners 19, extending across the roof over its whole length, for cooperation with transversely extending members of a structure to be supported, to form a stable assembly. An air inlet fitting is diagrammatically indicated at 20.

Figure 6:
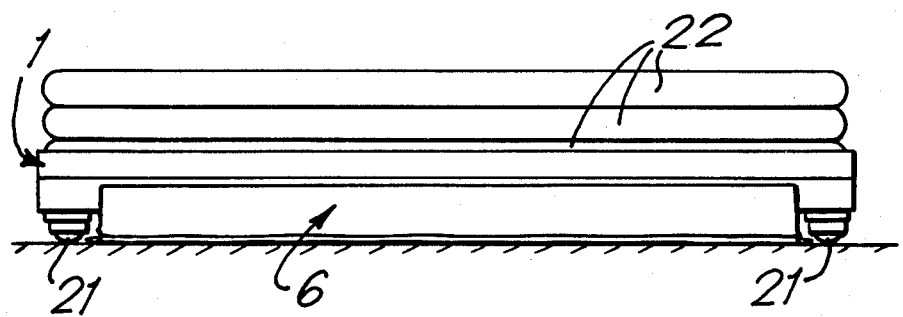
FIG. 6 is a view in side elevation of a third embodiment.

Referring lastly to FIG. 6, this illustrates an embodiment similar to that of FIGS. 3 to 5 but in which the load-carrying structure 1 is provided with ground-engaging supports in the form of four roller feet 21 at its corners, and furthermore carries load elevating means in the form of an interconnected and cooperating assembly of inflatable cushions 22, for example as disclosed in our U.S. Pat. No. 4,275,869. It will be noted that in order to accommodate the roller feet 21 the skirt 6 terminates short of the ends of the structure 1, being sealed to the underside of such structure at the ends of the skirt roof 17.

I claim:

1. An air-cushion supported, manually maneuverable, load-carrying apparatus comprising:
   a load-carrying base;
   a dependent perimetric shirt for laterally confining pressurized air; and means for restraining a foot portion of said skirt to a permanently inwardly extending configuration for urging said skirt into sealing engagement with the ground by the internal air pressure during operation, said foot portion having at least one ground-engaging sealing fin extending all around the skirt;

wherein said skirt restraining means is secured to the skirt at spaced inner and outer regions, spanning said foot portion, said skirt restraining means having rectilinear spacing being substantially less than the corresponding width of the foot portion for providing the foot portion with freedom to seal with the ground, said skirt including means for urging the foot portion into substantially continuous sealing engagement with an irregular ground surface when the skirt is not pressurized.

2. Apparatus as claimed in claim 16, wherein said load-carrying base carries load-elevating means comprising at least one inflatable cushion.

3. Apparatus as claimed in claim 1, including rolling or sliding underneath supports secured to the said base member for engagement with the ground at least when the skirt is pressurized.

4. An apparatus for forming an air-cushion chamber for location under a load comprising:
   a member forming a substantially air-tight roof for the chamber;
   a dependent perimetric skirt for laterally confining pressurized air; and
   means for restraining a foot portion of said skirt to a permanently inwardly extending configuration for urging said skirt into sealing engagement with the ground by the internal air pressure during operation, said foot portion having at least one ground-engaging sealing fin extending all around the skirt;
   wherein said skirt restraining means is secured to the skirt at spaced inner and outer regions, spanning said foot portion, said skirt restraining means having rectilinear spacing being substantially less than the corresponding width of the foot portion for providing the foot portion with freedom to seal with the ground, said skirt including means for urging the foot portion into substantially continuous sealing engagement with an irregular ground surface when the skirt is not pressurized.

5. Apparatus as claimed in claim 4, which apparatus is adapted to be rolled up for transportation and storage.

6. Apparatus as claimed in claim 4, including elongate stiffening members incorporated in said chamber roof and extending in at least one direction.

7. Apparatus as claimed in claim 4, wherein said roof member is provided with upwardly extending flanges on at least two opposite sides thereof for attachment of the apparatus to a load.

8. Apparatus as claimed in claim 1 or 4, having a plurality of said sealing fins spaced laterally of one another.

9. Apparatus as claimed in claim 1 or 4, wherein the or each said sealing fin is formed as an integral part of the skirt by a gathered portion of the skirt material.

10. Apparatus as claimed in claim 1 or 4, wherein sid urging means comprises a resilient, vertically compressible, perimetric wall inside the skirt and overlying the said foot portion thereof.

11. Apparatus as claimed in claim 1 or 4, wherein said urging means comprises a multiplicity of discrete weights attached to the skirt inside the said foot portion thereof.

12. Apparatus as claimed in claim 11 wherein said weights comprise a continuous series of metal balls housed in a flexible tube.

13. Apparatus as claimed in claim 1 or 4, including means for holding the said skirt restraining means substantially out of contact with the ground when the skirt is pressurized.

14. An apparatus for forming an air-cushion chamber for location under a load comprising:
   a member forming a substantially air-tight roof for the chamber;
   a dependent perimetric skirt for laterally confining pressurized air;
   means for restraining a foot portion of said skirt to a permanently inwardly extending configuration for urging said skirt into sealing engagement with the ground by the internal air pressure during operation; and
   a plurality of discrete weights being attached to the skirt inside the foot portion thereof for urging the foot portion into a substantially continuous sealing engagement with an irregular ground surface when the skirt is unpressurized;
   wherein said skirt restraining means is secured to the skirt at spaced inner and outer regions, spanning said foot portion, said skirt restraining means having rectilinear spacing being substantially less than the corresponding width of the foot portion for providing the foot portion with freedom to seal with the ground.

15. An apparatus as claimed in claim 14, wherein the foot portion of the skirt is provided with at least one ground-engaging sealing fin located adjacent said weights and extending all around the skirt, said fin being downwardly deflectable upon inflation of the skirt.

16. An apparatus for forming an air-cushion chamber for location under a load, such apparatus being adapted to be rolled up for transportation and storage comprising:
   a flexible member forming a substantially air-tight roof for the chamber;
   a dependent perimetric skirt for laterally confining pressurized air; and
   means for restraining a foot portion of said skirt to a permanently inwardly extending configuration for urging said skirt into sealing engagement with the ground by the internal air pressure during operation;
   wherein said skirt restraining means is secured to the skirt at spaced inner and outer regions, spanning said foot portion, said skirt restraining means having rectilinear spacing being substantially less than the corresponding width of the foot portion for providing the foot portion with freedom to seal with the ground.

* * * * *